(12) United States Patent
Iwazaki et al.

(10) Patent No.: US 10,992,218 B2
(45) Date of Patent: Apr. 27, 2021

(54) HARMONIC SUPPRESSION DEVICE AND HARMONIC SUPPRESSION SYSTEM

(71) Applicant: Mitsubishi Electric Corporation, Tokyo (JP)

(72) Inventors: Kenji Iwazaki, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 16/462,646

(22) PCT Filed: Feb. 2, 2017

(86) PCT No.: PCT/JP2017/003810
§ 371 (c)(1),
(2) Date: May 21, 2019

(87) PCT Pub. No.: WO2018/142543
PCT Pub. Date: Aug. 9, 2018

(65) Prior Publication Data
US 2020/0067399 A1 Feb. 27, 2020

(51) Int. Cl.
*H02M 1/12* (2006.01)
*H02J 3/01* (2006.01)
*H02J 3/16* (2006.01)

(52) U.S. Cl.
CPC .............. *H02M 1/12* (2013.01); *H02J 3/01* (2013.01); *H02J 3/16* (2013.01)

(58) Field of Classification Search
CPC .............. H02M 1/12; H02J 3/01; H02J 3/16
See application file for complete search history.

(56) References Cited

U.S. PATENT DOCUMENTS

| 2008/0285317 | A1 | 11/2008 | Rotzoll |
| 2009/0021964 | A1* | 1/2009 | Hsu ........................ H02J 3/1842 363/41 |
| 2013/0135907 | A1* | 5/2013 | Oi ............................ H02J 3/01 363/40 |
| 2014/0002034 | A1 | 1/2014 | Huang et al. |

(Continued)

FOREIGN PATENT DOCUMENTS

| CN | 104218584 A | * 12/2014 |
| JP | H07-274398 A | 10/1995 |
| JP | H09-200956 A | 7/1997 |

(Continued)

OTHER PUBLICATIONS

Extended European Search Report dated Jan. 10, 2020 issued in corresponding EP patent application No. 17895446.7.

(Continued)

*Primary Examiner* — Thienu V Tran
*Assistant Examiner* — Bart Iliya
(74) *Attorney, Agent, or Firm* — Posz Law Group, PLC

(57) ABSTRACT

A harmonic suppression device includes a power converter that generates a harmonic suppression current that is an electric current for suppressing a harmonic current flowing in a power line and outputs the generated harmonic suppression current to the power line, a communication unit that exchanges signals with other harmonic suppression devices, and a controller that controls the power converter based on a signal received by the communication unit.

12 Claims, 8 Drawing Sheets

(56) References Cited

U.S. PATENT DOCUMENTS

2014/0268958 A1  9/2014  Chapman

FOREIGN PATENT DOCUMENTS

| JP | 10-150778 | A | 6/1998 |
| JP | 11-266536 | A | 9/1999 |
| JP | 2000-341857 | A | 12/2000 |
| JP | 2010-527571 | A | 8/2010 |
| WO | 2016/202859 | A1 | 12/2016 |

OTHER PUBLICATIONS

International Search Report of the International Searching Authority dated Apr. 18, 2017 for the corresponding international application No. PCT/JP2017/003810(and English translation).
Office Action dated Mar. 31, 2020 issued in corresponding JP patent application No. 2018-565169 (and English translation).
Office Action dated Sep. 22, 2020 issued in corresponding KR patent application No. 10-2019-7017585 (and English translation).

\* cited by examiner

(12) United States Patent
US 10,992,218 B2

HARMONIC SUPPRESSION DEVICE AND HARMONIC SUPPRESSION SYSTEM

CROSS REFERENCE TO RELATED APPLICATION

This application is a U.S. national stage application of International Patent Application No. PCT/JP2017/003810 filed on Feb. 2, 2017, the disclosure of which is incorporated herein by reference.

TECHNICAL FIELD

The present invention relates to a harmonic suppression device and a harmonic suppression system for suppressing a harmonic current flowing from a load toward a power supply.

BACKGROUND

A harmonic suppression device, which is referred to as an active filter, is a device provided between a power supply and a load to suppress a harmonic current generated in the load including a power conversion circuit.

The harmonic suppression device extracts a harmonic component included in a power supply current, generates an electric current in a phase reverse of that of the component, and outputs the generated current toward the power supply so as to suppress a harmonic current. Therefore, the harmonic suppression device detects a harmonic component of an electric current flowing in a power supply line using a sensor attached to the power supply line and generates an electric current that cancels the detected harmonic component. Generally, the sensor is attached to the power supply line of the load to which the harmonic suppression device is applied, that is, a wiring line connecting between a power line connected to a power supply source and the load. In a case where two or more loads are connected in parallel, by provision of a sensor on the side of the power supply source of a power line connected with these loads, the harmonic suppression device can collectively suppress the harmonic components flowing from the two or more loads to the power line. In addition, it is possible that two or more harmonic suppression devices are provided in parallel similarly to the loads and these harmonic suppression devices suppresses the harmonic components flowing from the two or more loads to the power line.

As a conventional system for suppressing a harmonic current by applying a harmonic suppression device, there is a harmonic suppression system described in Patent Literature 1.

PATENT LITERATURE

Patent Literature 1: Japanese Patent Application Laid-Open No. 7-274398

TECHNICAL PROBLEM

Since the harmonic suppression device generates an electric current used for harmonic suppression by pulse width modulation, a switching loss is caused. In a case where two or more harmonic suppression devices are attached, since a switching loss is caused in each harmonic suppression device, the switching loss of the entire system increases, thereby making it difficult to achieve power saving. These situations have been problematic.

SUMMARY

The present invention has been made in consideration of the above circumstances, and an object of the present invention is to provide a harmonic suppression device capable of achieving power saving.

In order to solve the above-mentioned problems and achieve the object, the present invention provides a harmonic suppression device comprising: a power converter to generate a harmonic suppression current that is an electric current for suppressing a harmonic current flowing in a power line and to output the generated harmonic suppression current to the power line; a communication unit to exchange signals with other harmonic suppression device; and a controller to control the power converter based on a signal received by the communication unit.

A harmonic suppression device according to the present invention has an advantageous effect of achieving power saving.

DETAILED DESCRIPTION

Hereinafter, a harmonic suppression device and a harmonic suppression system according to embodiments of the present invention will be described in detail with reference to the drawings. The present invention is not necessarily limited by these embodiments.

First Embodiment

Figure 1:
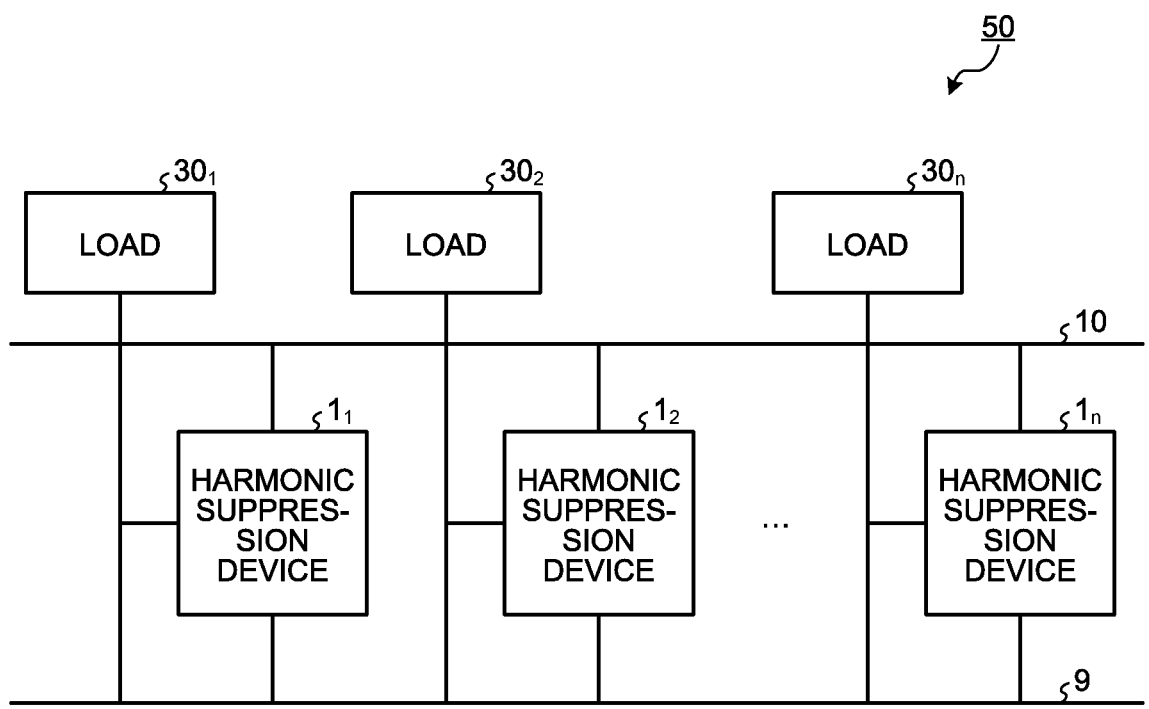
FIG. 1 is a diagram illustrating an exemplary configuration of a harmonic suppression system according to a first embodiment.

FIG. 1 is a diagram illustrating an exemplary configuration of a harmonic suppression system according to a first embodiment. A harmonic suppression system 50 according to the first embodiment includes a plurality of harmonic suppression devices $1_1, 1_2, \ldots,$ and $1_n$. The harmonic suppression devices $1_1, 1_2, \ldots,$ and $1_n$ are connected to a power line 9 and a communication line 10 and can communicate via the communication line 10. In the following description, an example of a case where the harmonic suppression devices $1_1, 1_2, \ldots,$ and $1_n$ perform wired communication will be described. However, a communication method is not limited to this example. A configuration for performing wireless communication may be used.

Furthermore, the harmonic suppression devices $1_1, 1_2, \ldots,$ and $1_n$ have functions of measuring electric currents flowing between loads $30_1, 30_2, \ldots,$ and $30_n$ and the power line 9 and functions of generating electric currents to suppress harmonic current components contained in the currents flowing between the loads $30_1, 30_2, \ldots,$ and $30_n$ and the power line 9, respectively. Hereinafter, the current for suppressing the harmonic current components is referred to as a harmonic suppression current. Each of the harmonic suppression devices $1_1, 1_2, \ldots,$ and $1_n$ includes an inverter, and uses the inverter to generate the harmonic suppression current. In the harmonic suppression system 50 illustrated in FIG. 1, the harmonic suppression device $1_1$ measures the current flowing between the load $30_1$ and the power line 9. The harmonic suppression device $1_2$ measures the current flowing between the load $30_2$ and the power line 9. The harmonic suppression device $1_n$ measures the current flowing between the load $30_n$ and the power line 9. Hereinafter, in a case where it is not necessary to distinguish the harmonic suppression devices $1_1, 1_2, \ldots,$ and $1_n$ from each other, each of the harmonic suppression devices is referred to as a harmonic suppression device 1. In a case where it is not necessary to distinguish the loads $30_1, 30_2, \ldots,$ and $30_n$ from each other, each of the loads is referred to as a load 30. The number of harmonic suppression devices 1 constituting the harmonic suppression system 50 only has to be two or more.

Furthermore, in the harmonic suppression system 50, any one of the harmonic suppression devices $1_1, 1_2, \ldots,$ and $1_n$ behaves as a master, and the others behave as slaves. Some or all of the harmonic suppression devices 1 including the master and the slaves generate the harmonic suppression current. The harmonic suppression device 1 that behaves as the master determines which harmonic suppression device should generate a harmonic suppression current. Specifically, the harmonic suppression device 1 that behaves as the master collects necessary information pieces from each of the harmonic suppression devices 1 that behave as the slaves, and determines a harmonic suppression device 1 that should generate the harmonic suppression current based on the collected information pieces. The information pieces collected by the master from the slaves are information pieces on a load current, a power supply voltage, a power supply phase, and the like which have been measured by the slaves. The load current is a current flowing between the load 30 and the power line 9, the power supply voltage is a voltage of the power line 9, and the power supply phase is a phase of the voltage of the power line 9. The harmonic suppression device 1 that behaves as the master determines a harmonic suppression device 1 that should generate the harmonic suppression current so as to produce a harmonic suppression current having a value equal to a total value of the harmonic currents flowed from the loads $30_1, 30_2, \ldots,$ and $30_n$. The harmonic suppression device 1 that behaves as the master may be fixed or may be changed when each certain period of time elapses.

Figure 2:
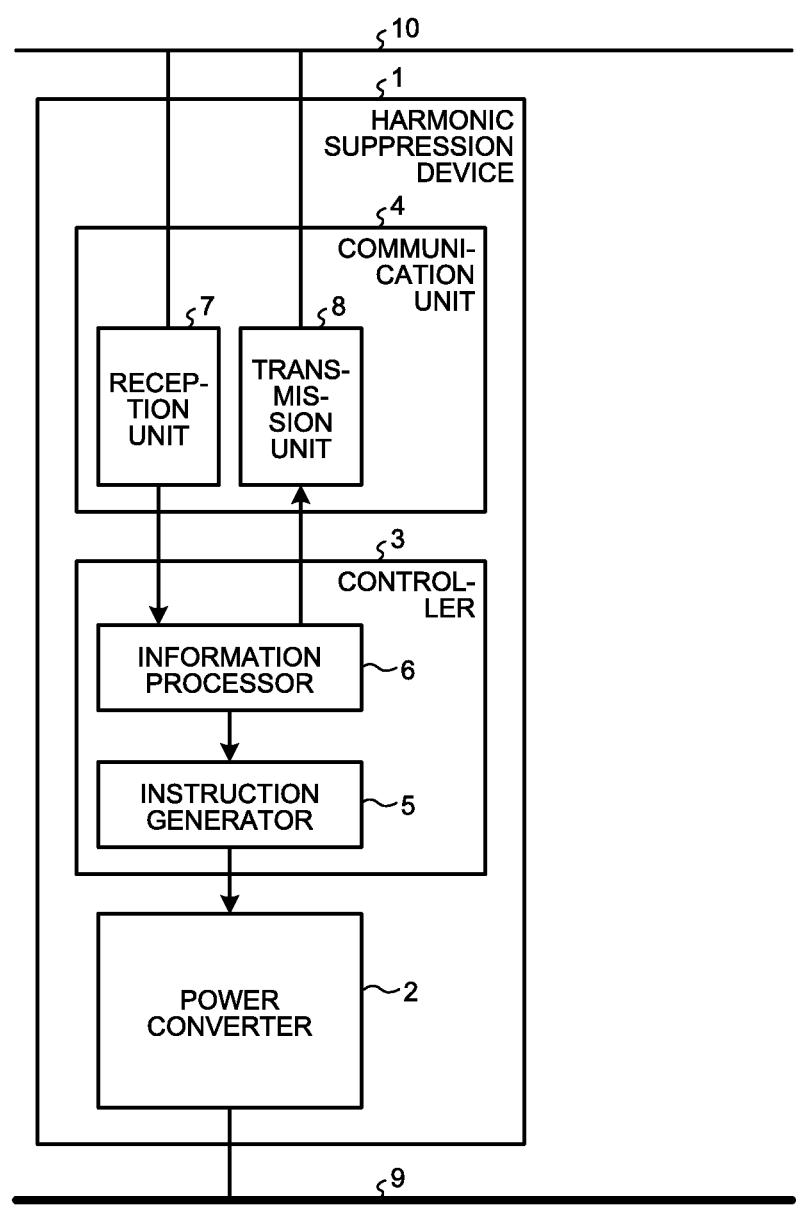
FIG. 2 is a diagram illustrating an exemplary configuration of a harmonic suppression device according to the first embodiment.

FIG. 2 is a diagram illustrating an exemplary configuration of the harmonic suppression device according to the first embodiment. The harmonic suppression device 1 includes a power converter 2 that generates a harmonic suppression current by Pulse Width Modulation (PWM), a controller 3 that controls the power converter 2, and a communication unit 4 that communicates with the other harmonic suppression device 1 via the communication line 10. The power converter 2 can be realized by an inverter, and the communication unit 4 can be realized by a modem.

The controller 3 includes an instruction generator 5 that generates an operation instruction for the power converter 2 and an information processor 6 that generates information to be transmitted to the other harmonic suppression device 1 and instructs an operation of the instruction generator 5 based on the information received from the other harmonic suppression device 1.

The communication unit 4 includes a reception unit 7 that receives the information transmitted from the other harmonic suppression device 1 and a transmission unit 8 that transmits the information outputted from the information processor 6 to the other harmonic suppression device 1.

Next, an operation of the harmonic suppression device 1 will be described. As described above, in the harmonic suppression system 50, one of the two or more harmonic suppression devices 1 behaves as the master, and the others behave as the slaves. That is, the harmonic suppression device 1 may behave as the master in one case, and but behave as the slave in another case. For this reason, a case where the harmonic suppression device 1 behaves as the master will be described as separated from a case where the harmonic suppression device 1 behaves as the slave.

Operation of Master Harmonic Suppression Device 1

Figures 3, 4:
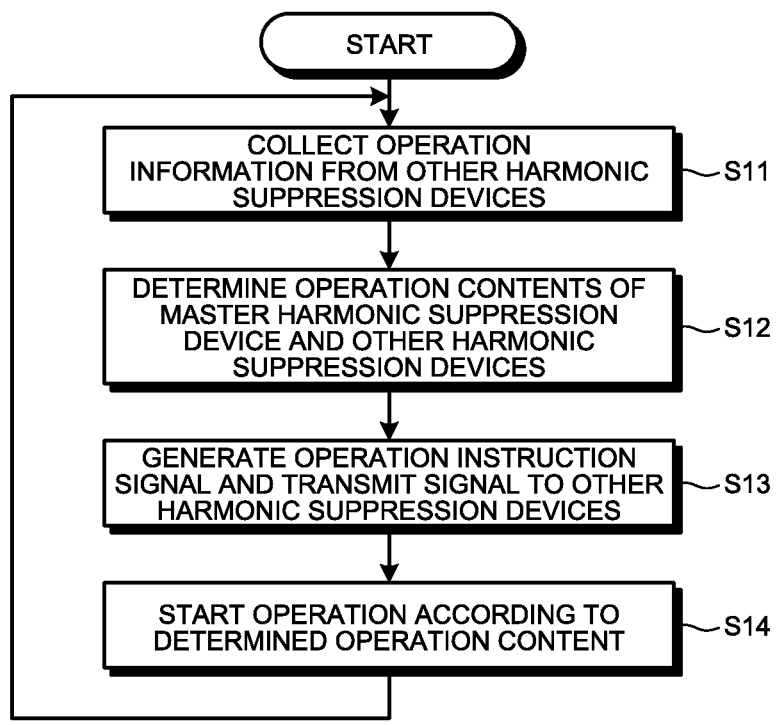
FIG. 3 is a flowchart illustrating an example of an operation in a case where the harmonic suppression device according to the first embodiment behaves as a master.
FIG. 4 is a diagram illustrating an exemplary configuration of an operation instruction signal transmitted by the master harmonic suppression device according to the first embodiment.

FIG. 3 is a flowchart illustrating an example of an operation in a case where the harmonic suppression device 1 according to the first embodiment behaves as the master. In a case where the harmonic suppression device 1 behaves as the master, first, the harmonic suppression device 1 collects operation information from the other harmonic suppression devices 1 that behave as the slaves (step S11). The operation information is information including information pieces on a load current, a power supply voltage, a power supply phase, and an output current. The output current is an electric current outputted by the other harmonic suppression device 1 to the power line 9, that is, the harmonic suppression current. In step S11, the master harmonic suppression device 1 collects the operation information from all the other harmonic suppression devices 1. To collect the operation information, the master harmonic suppression device 1 may request the slave harmonic suppression device 1 to transmit the operation information, or each of the slave harmonic suppression devices 1 may autonomously transmit the operation information to the master harmonic suppression device 1 in a predetermined cycle.

Next, the master harmonic suppression device 1 determines an operation content of the master harmonic suppression device 1 and the other harmonic suppression devices 1 based on the collected operation information (step S12). The operation content said herein is regarded as values of the harmonic suppression currents generated by the master harmonic suppression device 1 and the other harmonic suppression device 1. That is, in step S12, the value of the harmonic suppression current generated by each of the harmonic suppression devices $1_1$ to $1_n$ included in the harmonic suppression system 50 is determined. In the master harmonic suppression device 1, the information processor 6 of the controller 3 determines the values of the harmonic suppression currents generated by the master harmonic suppression device 1 and the other harmonic suppression devices 1 based on the operation information collected from the slave harmonic suppression device 1. The information processor 6 determines the values of the harmonic suppression currents generated by the master harmonic suppression device 1 and the other harmonic suppression devices 1 using the load current, the power supply voltage, and the power supply phase measured by the master harmonic suppression device 1.

In step S12, the information processor 6 calculates a total value of the harmonic currents flowing from the loads $30_1$ to $30_n$ to the power line 9, that is, a harmonic current of the entire system based on the current, the power supply voltage, the power supply phase included in each piece of the collected operation information and the current, the power supply voltage, and the power supply phase, measured by the master harmonic suppression device 1. Next, the information processor 6 determines the harmonic suppression device 1 that should generate a harmonic suppression current necessary for canceling the calculated harmonic current of the entire system. At this time, the information processor 6 determines a harmonic suppression device 1 that generates the harmonic suppression current such that a loss of the entire harmonic suppression system 50 is minimized. More specifically, the information processor 6 stores efficiency characteristics representing a relation between output power and an efficiency of the harmonic suppression devices 1 included in the harmonic suppression system 50 in advance, and calculates the number of harmonic suppression devices 1 for generating the necessary harmonic suppression current when the devices 1 are operated near the most efficient operating point, and determines the harmonic suppression device(s) 1 to be operated. By determining a harmonic suppression device 1 that generates the harmonic suppression current in consideration of the efficiency characteristics of the harmonic suppression device 1 that generates the harmonic suppression current and the number of the harmonic suppression devices 1 to be operated, a switching loss of the entire harmonic suppression system 50 can be reduced, and power saving can be realized.

Next, the master harmonic suppression device 1 generates an operation instruction signal indicating the determined value of the harmonic suppression current and transmits the generated signal to the other harmonic suppression devices 1 (step S13). The master harmonic suppression device 1 transmits the operation instruction signal to all the other harmonic suppression devices 1. To a harmonic suppression device 1 that has not been determined as the harmonic suppression device 1 that should generate the harmonic suppression current in the above step S12, the master device 1 transmits an operation instruction signal having a content for instructing to stop an operation of generating a harmonic suppression current. The operation instruction signal is, for example, a signal having a configuration illustrated in FIG. 4. FIG. 4 is a diagram illustrating an exemplary configuration of the operation instruction signal transmitted by the master harmonic suppression device according to the first embodiment. The operation instruction signal is a signal consisting of a signal type, a device ID (Identification), and output power information. The signal type is information indicating what kind of information is included in the signal, the device ID is information indicating to which harmonic suppression device 1 the signal is transmitted, and the output power information is information indicating the value of the harmonic suppression current. The "signal type" can be a one-bit signal. For example, in a case of the operation instruction signal, the signal type is "0", and in a case of an operation information signal described later, the signal type is "1". The "device ID" is a bit string that is individually assigned to each harmonic suppression device 1 and uniquely specifies each harmonic suppression device 1. A bit string of the output power information instructs the value of the harmonic suppression current generated by the harmonic suppression device 1 that has received the operation instruction signal by specifying what percentage of a rated output the harmonic suppression device 1 should operate with. In a case where the output power information is three-bit signal, values from 0% to 100% are expressed in increments of 14.3%. Note that "0%" means an operation stop state in which generation of the harmonic suppression current is not performed. Therefore, in a case of the operation instruction signal transmitted to the harmonic suppression device 1 that has not been determined as the harmonic suppression device 1 that should generate the harmonic suppression current in the above step S12, the output power information is a value representing "0%". Furthermore, since the harmonic suppression device 1 that generates the harmonic suppression current operates near the most efficient operating point, the output power information to be transmitted to the harmonic suppression device 1 that generates the harmonic suppression current is a fixed value representing an output near the most efficient operating point. The configuration illustrated in FIG. 4 is an example, and other configuration may be used. For example, identification information of the master harmonic suppression device 1 may be included in the operation instruction signal.

Next, the master harmonic suppression device 1 starts an operation according to the operation content determined in the above step S12 (step S14). When determining that the master harmonic suppression device 1 should generate the harmonic suppression current, the master harmonic suppression device 1 starts a generation operation of the harmonic suppression current, and when determining that it should not generate the harmonic suppression current, the master harmonic suppression device 1 does not perform the generation operation of the harmonic suppression current. The operation of the harmonic suppression device 1 generating the harmonic suppression current is similar to an operation of a conventional harmonic suppression device, and so the description thereof will be omitted.

The master harmonic suppression device 1 repeats the above-described processing in steps S11 to S14 in predetermined cycles.

Operation of Slave Harmonic Suppression Device 1

Figure 5:
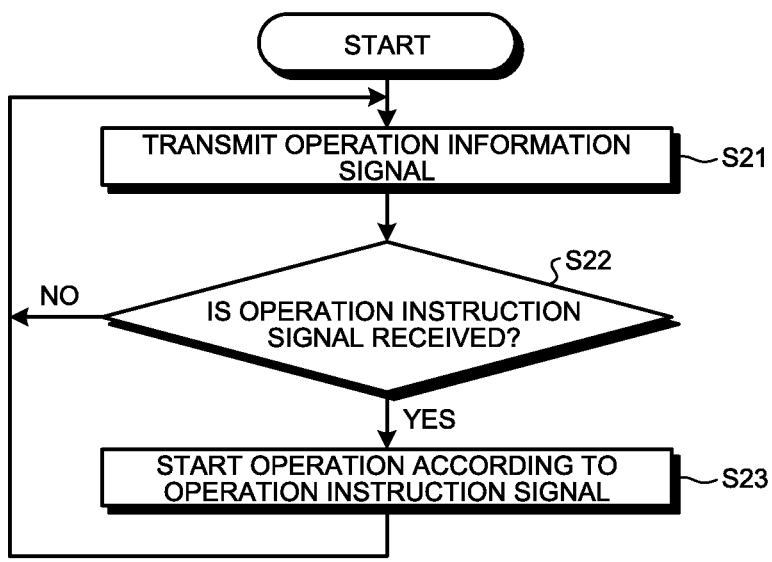
FIG. 5 is a flowchart illustrating an example of an operation in a case where the harmonic suppression device according to the first embodiment behaves as a slave.

FIG. 5 is a flowchart illustrating an example of an operation in a case where the harmonic suppression device 1 according to the first embodiment behaves as a slave. In a case where the harmonic suppression device 1 behaves as the slave, first, the harmonic suppression device 1 transmits the operation information signal to the other harmonic suppression device 1 that behaves as the master (step S21). The operation information signal is a signal containing the operation information mentioned above. The operation information signal has a configuration similar to the configuration of the operation instruction signal illustrated in FIG. 4. That is, the operation information signal is a signal that consists of the signal type, the device ID, and the operation information. As described in the description on the operation instruction signal, in a case of the operation information signal, the "signal type" is "1". A value specifying the slave harmonic suppression device 1, that is, the harmonic suppression device 1 that transmits the operation information signal is set to the "device ID". In the slave harmonic suppression device 1, the information processor 6 generates the operation information signal, and the transmission unit 8 transmits the operation information signal to the master harmonic suppression device 1.

Next, the slave harmonic suppression device 1 confirms whether or not the operation instruction signal is received (step S22), and in a case where the operation instruction signal is not received (step S22: No), the device 1 returns to step S21. In this case, the slave harmonic suppression device 1 waits for a lapse of predetermined time and thereafter executes transmission of the operation information signal again. In a case where the slave harmonic suppression device 1 has received the operation instruction signal (step S22: Yes), the harmonic suppression device 1 starts an operation according to the received operation instruction signal (step S23). In a case where the operation instruction signal indicates the content for instructing to generate the harmonic suppression current, that is, in a case where the output power information of the operation instruction signal is not zero, the slave harmonic suppression device 1 starts an operation of generating the harmonic suppression current with the output indicated by the output power information. In this case, the instruction generator 5 generates an operation instruction having a content according to the output power information and outputs the generated instruction to the power converter 2. On the other hand, in a case where the operation instruction signal indicates the content not to instruct to generate the harmonic suppression current, that is, in a case where the output power information of the operation instruction signal is zero, the slave harmonic suppression device 1 does not perform an operation of generating the harmonic suppression current. After executing step S23 and starting the operation, the slave device 1 returns to step S21.

As described above, in the harmonic suppression system 50 according to the present embodiment, one of the two or more harmonic suppression devices 1 behaves as the master and collects the operation information from the harmonic suppression device 1 that behaves as the slave. Then, the master harmonic suppression device 1 determines which harmonic suppression device 1 from among the harmonic suppression devices 1 included in the harmonic suppression system 50 should generate the harmonic suppression current to suppress the harmonic current flowing from the load 30, based on the collected operation information. With this structure, an unnecessary increase in the number of harmonic suppression devices 1 to generate the harmonic suppression current can be prevented, and the switching loss of the entire system can be reduced. As a result, power saving can be realized.

The harmonic suppression device 1 according to the present embodiment exchanges the operation instruction signal and the operation information signal with the other harmonic suppression device 1. However, at the time of mutual communication, the signals conflict with each other if the priority of communication is not determined. It is considered to make priority ranking of the devices using the device ID at the time of activating each harmonic suppression device 1. Specifically, it is considered to make the priority ranking of the devices in ascending or descending order of the device IDs. It is assumed that each harmonic suppression device 1 beforehand hold the device IDs of all the harmonic suppression devices 1 constituting the harmonic suppression system 50.

The harmonic suppression device 1 having a top priority behaves as the master, and the remainder harmonic suppression devices 1 behave as the slaves. The master harmonic suppression device 1 first communicates with the slave harmonic suppression device 1 having a top priority to receive an operation information signal and finally communicates with the slave harmonic suppression device 1 having the lowest priority to receive the operation information signal. Similarly, in a case where the master harmonic suppression device 1 transmits the operation instruction signal to the slave harmonic suppression device 1, the master harmonic suppression device 1 performs communication according to the priority ranking applied to the harmonic suppression devices 1.

According to the operation instruction signal received from the master harmonic suppression device 1, the slave harmonic suppression device 1 switches between the operation and the stop of the power converter 2 and adjusts an output during the operation. Even in a case where the power converter 2 stops, the slave harmonic suppression device 1 causes the controller 3 and the communication unit 4 to be continued to operate and transmits the operation information signal to the master harmonic suppression device 1.

The priority ranking of the harmonic suppression devices 1 may be changed when each determined period of time elapses. When changing the priority ranking, the master harmonic suppression device 1 determines a new ranking based on the operation information collected from the harmonic suppression devices 1. As a method for determining the new ranking, a method for determining the new ranking based on the load current that is an electric current flowing between the load 30 and the power line 9 and a method for determining the new ranking based on the output current are conceivable, but other methods may be used therefor. In a case where the new ranking has been determined, the master harmonic suppression device 1 notifies each harmonic suppression device 1 of the determined ranking. After changing the ranking, each harmonic suppression device 1 performs communication according to the new ranking that has been changed. Furthermore, a harmonic suppression device 1 having the highest ranking behaves as the master.

In the harmonic suppression system 50, the master harmonic suppression device 1 may determine a harmonic suppression device 1 that should generate the harmonic suppression current, such that operation times of the harmonic suppression devices 1 can be averaged. In this case, each harmonic suppression device 1 measures its operation time in a primary step, and then, when a cumulative operation time has reached a determined value, the slave harmonic suppression device 1 transmits the operation information signal including the information indicating that the cumulative operation time has reached the determined value to the master harmonic suppression device 1. The master harmonic suppression device 1 determines a harmonic suppression device 1 that should generate the harmonic suppression current instead of the harmonic suppression device 1 of which the cumulative operation time has reached the determined value. In a case where all the harmonic suppression devices 1 are operated, even when the cumulative operation time of the harmonic suppression device 1 has reached the determined value, the harmonic suppression device 1 is made to continue the operation. Furthermore, the determined value used for determination of whether to stop the operation is changed as appropriate. As a method for changing the determined value, a method for increasing the determined value when the cumulative operation times of all the harmonic suppression devices 1 have reached the determined value is conceivable. Instead of increasing the determined value when the cumulative operation times of all the harmonic suppression devices 1 have reached the determined value, the cumulative operation times of all the harmonic suppression devices 1 may be initialized, that is, may be returned to zero.

In addition, when a detection value of a temperature sensor attached to the harmonic suppression device 1 has reached a determined value, the device 1 may stop operation and instead the other harmonic suppression device 1 may start operation. In this case, the slave harmonic suppression device 1 transmits an operation information signal including information indicating that the detection value of the temperature or the temperature has reached a determined value to the master harmonic suppression device 1, and the master harmonic suppression device 1 determines a harmonic suppression device 1 that should perform the operation instead.

Second Embodiment

Figure 6:
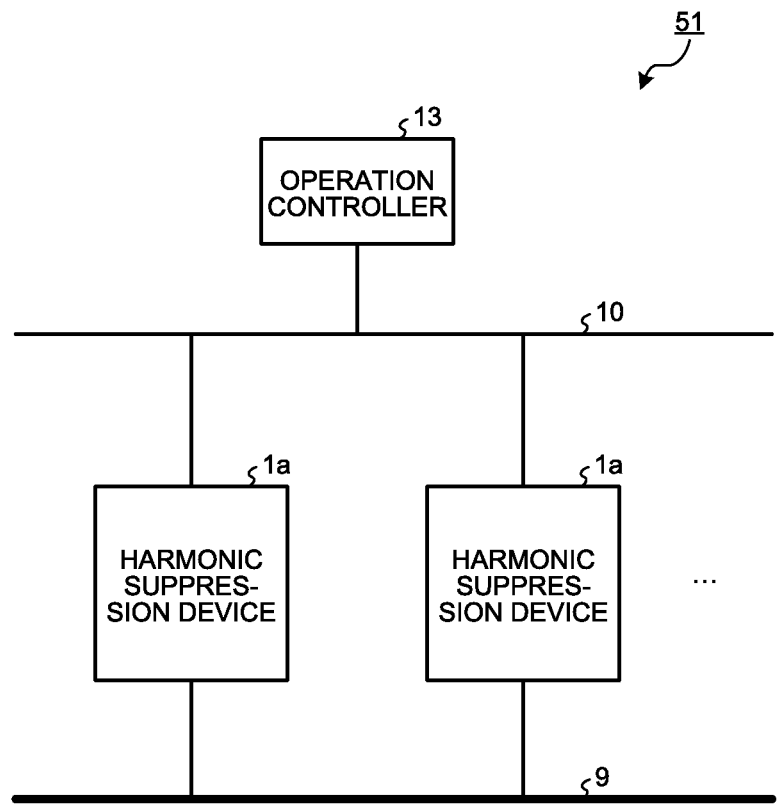
FIG. 6 is a diagram illustrating an exemplary configuration of a harmonic suppression system according to a second embodiment.

FIG. 6 is a diagram illustrating an exemplary configuration of a harmonic suppression system according to a second embodiment. A harmonic suppression system 51 according to the second embodiment includes two or more harmonic suppression devices 1a and an operation controller 13. Similarly to the harmonic suppression device 1 according to the first embodiment, the harmonic suppression device 1a is connected to the power line 9 and the communication line 10. Furthermore, the operation controller 13 is connected to the communication line 10. Each harmonic suppression device 1a can communicate with the operation controller 13 via the communication line 10. In FIG. 6, description of loads corresponding to the loads 30₁ to 30ₙ illustrated in FIG. 1 is omitted.

In the harmonic suppression system 50 described in the first embodiment, one of the plurality of harmonic suppression devices 1 behaves as the master, and the master harmonic suppression device 1 determines a harmonic suppression device 1 that should generate the harmonic suppression current. On the other hand, in the harmonic suppression system 51 according to the present embodiment, the operation controller 13 determines a harmonic suppression device 1a that should generate the harmonic suppression current. Therefore, the operation controller 13 includes a controller and a communication unit similar to the controller 3 and the communication unit 4 constituting the harmonic suppression device 1 described in the first embodiment.

Figure 7:
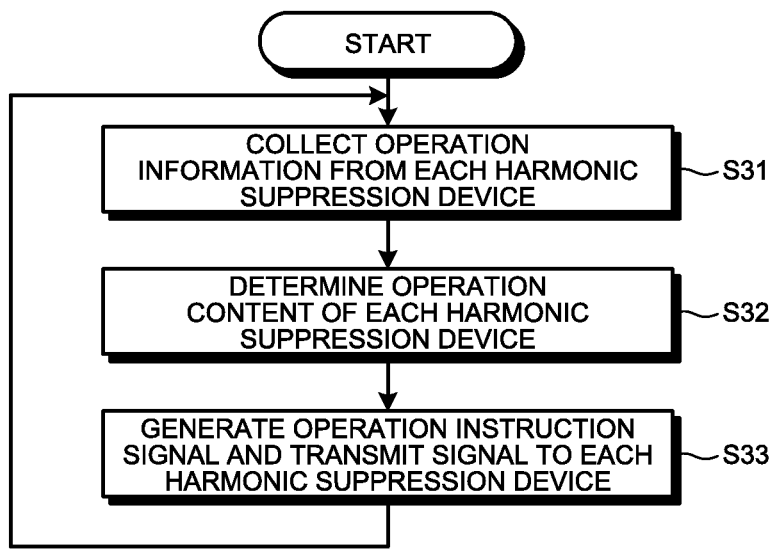
FIG. 7 is a flowchart illustrating an example of an operation of an operation controller according to the second embodiment.

FIG. 7 is a flowchart illustrating an example of an operation of the operation controller 13 according to the second embodiment. First, the operation controller 13 collects the operation information from the harmonic suppression devices 1a (step S31). The processing in step S31 is similar to the processing in step S11 (see FIG. 3) described previously, which is executed in a case where the harmonic suppression device 1 according to the first embodiment behaves as the master.

Next, the operation controller 13 determines an operation content of each harmonic suppression device 1a based on the collected operation information (step S32). The processing in step S32 is similar to the processing in step S12 (see FIG. 3) described previously, which is executed in a case where the harmonic suppression device 1 according to the first embodiment behaves as the master.

Next, the operation controller 13 generates an operation instruction signal indicating the value of the determined harmonic suppression current and transmits the generated signal to each harmonic suppression device 1a (step S33). The processing in step S33 is similar to the processing in step S13 (see FIG. 3) described previously, which is executed in a case where the harmonic suppression device 1 according to the first embodiment behaves as the master.

The operation controller 13 repeats the above-mentioned processing in steps S31 to S33 in determined cycles.

The harmonic suppression device 1a executes the processing similar to the processing in a case where the harmonic suppression device 1 according to the first embodiment behaves as the slave. That is, the harmonic suppression device 1a operates according to steps S21 to S23 illustrated in FIG. 5. However, in step S21, the operation instruction signal is transmitted to the operation controller 13. The configuration of the harmonic suppression device 1a is similar to the configuration of the harmonic suppression device 1 according to the first embodiment.

As described above, in the harmonic suppression system 51 according to the present embodiment, the operation controller 13 collects the operation information pieces from the harmonic suppression devices 1a. Then, the operation controller 13 determines which one of the harmonic suppression devices 1a should generate the harmonic suppression current, based on the collected operation information pieces. With this structure, an effect similar to the effect of the harmonic suppression system 50 according to the first embodiment can be obtained.

Third Embodiment

Subsequently, a harmonic suppression system according to a third embodiment will be described. A configuration of the harmonic suppression system according to the third embodiment is similar to that in the first embodiment. That is, the harmonic suppression system according to the third embodiment includes a plurality of harmonic suppression devices, wherein the single harmonic suppression device behaves as the master, and the others behave as the slaves. In addition, the master harmonic suppression device collects the operation information pieces from the slave harmonic suppression devices and determines a harmonic suppression device that should generate the harmonic suppression current. However, the harmonic suppression devices of the harmonic suppression system according to the third embodiment communicate with each other via the power line. That is, each harmonic suppression device of the harmonic suppression system according to the third embodiment exchanges signals through power line communication. A difference between the harmonic suppression system according to the first embodiment and the harmonic suppression system according to the third embodiment is that the harmonic suppression device included in the system performs communication via the communication line or communication via the power line.

Figure 8:
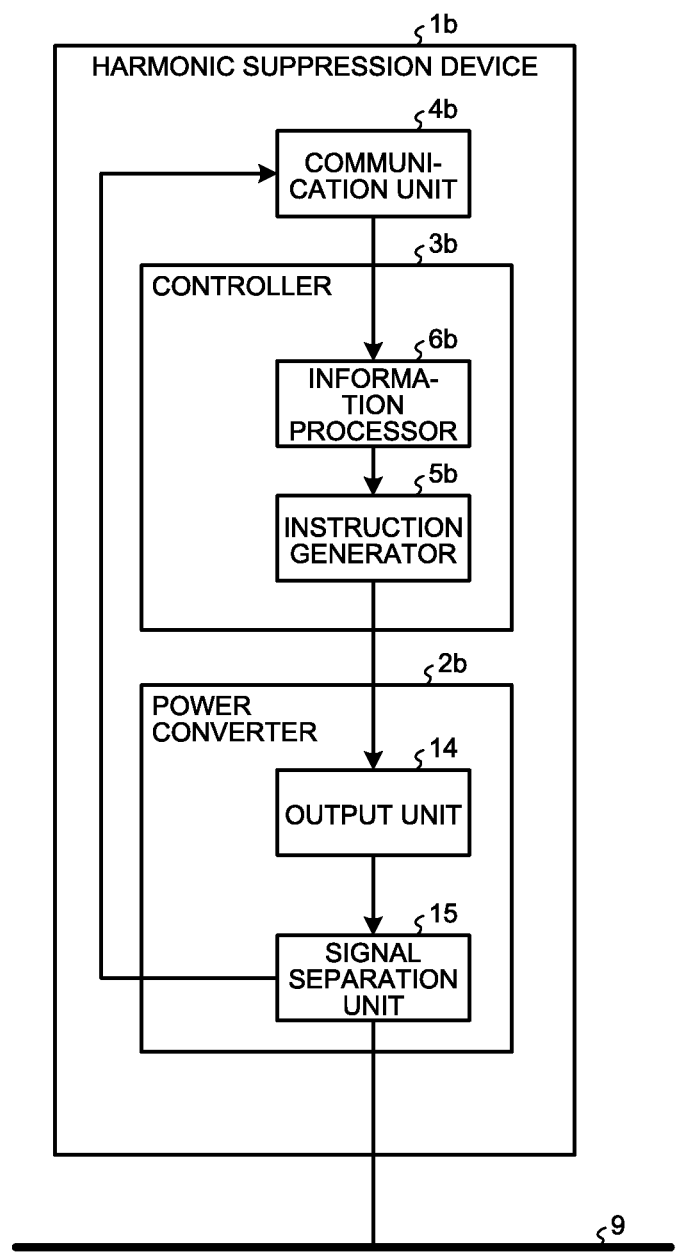
FIG. 8 is a diagram illustrating an exemplary configuration of a harmonic suppression device according to a third embodiment.

FIG. 8 is a diagram illustrating an exemplary configuration of the harmonic suppression device according to the third embodiment. A harmonic suppression device 1b according to the third embodiment includes a power converter 2b that is composed of an output unit 14 and a signal separation unit 15, a controller 3b that is composed of an instruction generator 5b and an information processor 6b, and a communication unit 4b.

Each part of the harmonic suppression device 1b will be described. The information processor 6b of the controller 3b executes processing similar to the processing of the information processor 6 of the controller 3 in the harmonic suppression device 1 according to the first embodiment. That is, in a case where the harmonic suppression device 1b behaves as the master, the information processor 6b collects the operation information pieces from the other harmonic suppression devices 1b and determines a harmonic suppression device 1b that should generate the harmonic suppression current based on the collected operation information pieces. When determining the harmonic suppression device 1b that should generate the harmonic suppression current, the information processor 6b generates the output power information indicating the determination result and outputs the information to the instruction generator 5b. On the other hand, in a case where the harmonic suppression device 1b behaves as the slave, the information processor 6b transmits the operation information of the slave harmonic suppression device 1b to the master harmonic suppression device 1b, and when the slave harmonic suppression device 1b has received the output power information from the master harmonic suppression device 1b, the information processor 6b outputs the output power information to the instruction generator 5b. When transmitting the operation information of the slave harmonic suppression device 1b to the master harmonic suppression device 1b, the information processor 6b outputs the operation information to the instruction generator 5b. The instruction generator 5b generates the operation instruction according to the information received from the information processor 6b and outputs the generated operation instruction to the power converter 2b, so as to control the power converter 2b. When the instruction generator 5b receives the output power information to be transmitted to the other harmonic suppression device 1b, the instruction generator 5b generates an operation instruction for instructing to generate a harmonic suppression current on which the operation instruction signal is superimposed and outputs the generated instruction to the power converter 2b. When the instruction generator 5b receives the operation information, the instruction generator 5b generates an operation instruction for instructing to generate a harmonic suppression current on which the operation information signal is superimposed and outputs the generated instruction to the power converter 2b. As described in the first embodiment, the operation instruction signal is a signal including the output power information (see FIG. 4), and the operation information signal is a signal including the operation information.

The output unit 14 of the power converter 2b is realized by an inverter and generates the harmonic suppression current by pulse width modulation according to the operation instruction received from the controller 3b. The harmonic suppression current generated by the output unit 14 is outputted to the power line 9 via the signal separation unit 15. The signal separation unit 15 of the power converter 2b is realized by a filter and separates the signal transmitted from the other harmonic suppression device 1b from the power line 9 and outputs the separated signal to the communication unit 4b. Specifically, in a case where the harmonic suppression device 1b behaves as the master, the signal separation unit 15 separates, from the power line 9, the operation information signal transmitted from the other harmonic suppression device 1b that behaves as the slave and outputs the separated signal to the communication unit 4b. In a case where the harmonic suppression device 1b behaves as the slave, the signal separation unit 15 separates, from the power line 9, the operation instruction signal transmitted from the other harmonic suppression device 1b that behaves as the master and outputs the separated signal to the communication unit 4b.

When receiving the signal from the signal separation unit 15, the communication unit 4b extracts information included in the received signal and outputs the information to the controller 3b. In a case where the received signal is an operation instruction signal, the communication unit 4b extracts the output power information therefrom and outputs the extracted output power information to the controller 3b. In a case where the received signal is an operation information signal, the communication unit 4b extracts the operation information therefrom and outputs the extracted operation information to the controller 3b.

As described above, the harmonic suppression device according to the present embodiment communicates with the other harmonic suppression devices via the power line. With this structure, the effect similar to the effect of the harmonic suppression device according to the first embodiment can be obtained without providing a dedicated communication line.

In the present embodiment, the power converter 2b includes the signal separation unit 15. However, the signal separation unit 15 may be provided outside the power converter 2b. Furthermore, a configuration can be used in which the harmonic suppression system according to the second embodiment uses power line communication.

Fourth Embodiment

Subsequently, a harmonic suppression system according to a fourth embodiment will be described. A configuration of the harmonic suppression system according to the fourth embodiment is similar to those in the first and third embodiments. That is, the harmonic suppression system according to the fourth embodiment includes a plurality of harmonic suppression devices, wherein the single harmonic suppression device behaves as the master, and the others behave as the slaves. In addition, the master harmonic suppression device collects the operation information pieces from the slave harmonic suppression devices and determines a harmonic suppression device that should generate the harmonic suppression current. The harmonic suppression devices of the harmonic suppression system according to the fourth embodiment communicate with each other via the power line as with the third embodiment. However, an internal configuration of the harmonic suppression device according to the fourth embodiment is different from an internal configuration of the harmonic suppression device according to the third embodiment.

Figure 9:
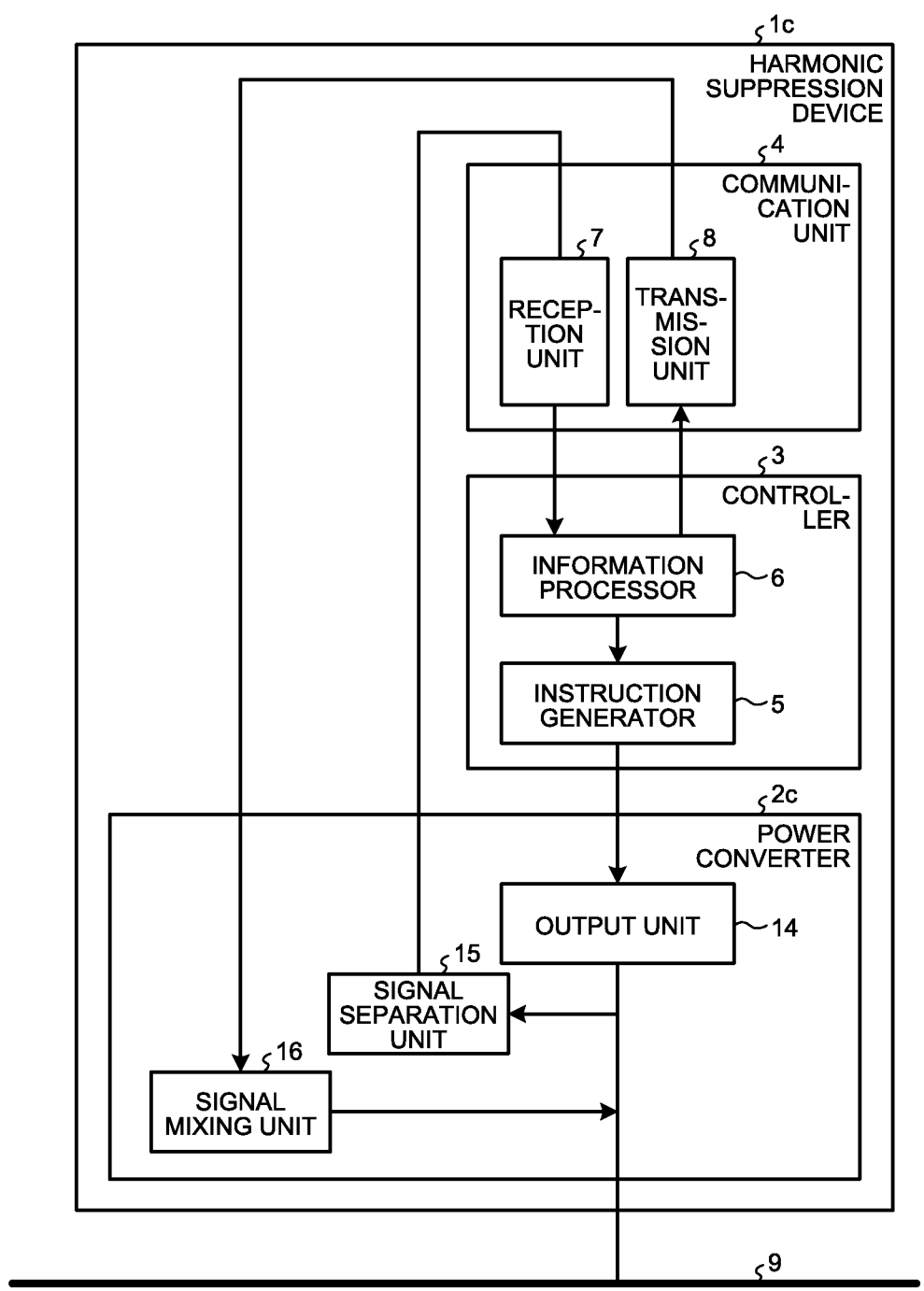
FIG. 9 is a diagram illustrating an exemplary configuration of a harmonic suppression device according to a fourth embodiment.

FIG. 9 is a diagram illustrating an exemplary configuration of the harmonic suppression device according to the fourth embodiment. A harmonic suppression device 1c according to the fourth embodiment includes: a power converter 2c that is composed of the output unit 14, the signal separation unit 15, and a signal mixing unit 16; the controller 3 that is composed of the instruction generator 5 and the information processor 6; and the communication unit 4 that is composed of the reception unit 7 and the transmission unit 8.

Since the controller 3 and the communication unit 4 are similar to the controller 3 and the communication unit 4 of the harmonic suppression device 1 described in the first embodiment, respectively, description thereof will be omitted. Furthermore, since the output unit 14 and the signal separation unit 15 of the power converter 2c are similar to the output unit 14 and the signal separation unit 15 of the power converter 2b described in the third embodiment, respectively, description thereof will be omitted.

The signal mixing unit 16 of the power converter 2c is realized by a mixer and superimposes the signal received from the transmission unit 8 of the communication unit 4 on the power line 9. That is, in a case where the harmonic suppression device 1c behaves as the master, the signal mixing unit 16 receives the operation instruction signal from the transmission unit 8 and superimposes the operation instruction signal on the power line 9. In addition, in a case where the harmonic suppression device 1c behaves as the slave, the signal mixing unit 16 receives the operation information signal from the transmission unit 8 and superimposes the operation information signal on the power line 9.

A difference between the harmonic suppression device 1b according to the third embodiment and the harmonic suppression device 1c according to the fourth embodiment is how to superimpose the operation instruction signal and the operation information signal on the power line 9. In the present embodiment, the power converter 2c is configured to include the signal separation unit 15 and the signal mixing unit 16. However, the signal separation unit 15 and the signal mixing unit 16 may be provided outside the power converter 2c.

As described above, the harmonic suppression device according to the present embodiment communicates with the other harmonic suppression devices via the power line similarly to the harmonic suppression device according to the third embodiment. The harmonic suppression device according to the present embodiment can obtain the effect similar to the effect of the harmonic suppression device according to the third embodiment.

In each embodiment described above, in a case where rewrite of a control program of the harmonic suppression device is performed, the rewrite is made by the following method. The control program is a program for realizing the controller of the harmonic suppression device of each embodiment.

In a case where it is necessary to rewrite the control program, an operation controller corresponding to the operation controller 13 of the second embodiment transmits a signal for rewriting preparation, a harmonic suppression device having received the signal stops a power conversion operation, and shifts to a rewrite waiting state to transmit a signal indicating that the device is currently waiting. The operation controller transmits a new control program to the harmonic suppression device that is in the rewrite waiting state. The waiting harmonic suppression device performs the rewrite operation when receiving the new control program and transmits a completion signal when the rewrite of the control program has been completed. Rewrite may be performed while temporarily stopping all the harmonic suppression devices, or may be performed while stopping each one or each set of some of the harmonic suppression devices so as not to reduce the entire harmonic suppression amount. These controls are performed by a signal or signals from the operation controller.

Figure 10:
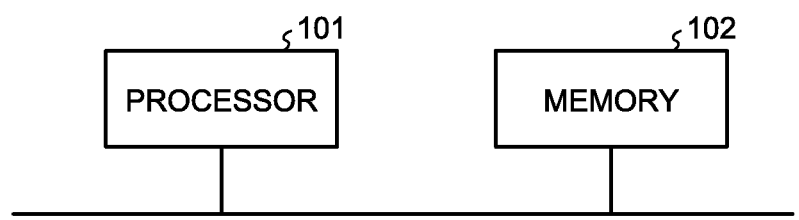
FIG. 10 is a diagram illustrating an exemplary hardware configuration of a controller included in the harmonic suppression device according to each embodiment.

The controller included in the harmonic suppression device according to each embodiment can be realized by a processor 101 and a memory 102 illustrated in FIG. 10. That is, the controller included in the harmonic suppression device according to each embodiment is realized by the processor 101 reading and executing the above-mentioned control program that is a program stored in the memory 102 and that is intended to realize a function as the controller.

The processor 101 is a processing circuit, for example, a CPU (also referred to as central processing unit, central processing device, processing device, calculation device, microprocessor, microcomputer, processor, and Digital Signal Processor (DSP)) or a system Large Scale Integration (LSI). The memory 102 is a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read-Only Memory (EEPROM), a magnetic disk, or an optical disk.

Structures illustrated in the above embodiments illustrate exemplary contents of the present invention and can be combined with other publicly known techniques. Furthermore, the structures illustrated in the embodiment can be partially omitted and/or modified without departing from the scope of the present invention.

The invention claimed is:

1. A harmonic suppression system comprising:
   two or more harmonic suppression devices to generate a harmonic suppression current, which is an electric current for suppressing a harmonic current flowing in a power line, and to exchange a signal between the harmonic suppression devices; and
   an operation controller to control the harmonic suppression devices, wherein:
   any one harmonic suppression device of the harmonic suppression devices stops operating after transmitting the signal, and any other harmonic suppression device of the harmonic suppression devices, which has stopped operating, starts to operate after receiving the signal,
   the harmonic suppression device includes:
     a power converter to generate the harmonic suppression current and to output the generated harmonic suppression current to the power line;
     a controller
       to generate an operation information signal including information on a current flowing between a load and the power line, a power supply voltage, and a power supply phase and information on a cumulative operation time, and
       to control the power converter based on an operation instruction signal received from the operation controller; and
     a communication unit to transmit the operation information signal to the operation controller and to receive the operation instruction signal, and
   the operation controller determines a value of the harmonic suppression current to be generated by the power converter based on the operation information signal and transmits the operation instruction signal indicating the determined value to the harmonic suppression device so that a cumulative operation time of the other harmonic suppression device that starts to operate is shorter than a cumulative operation time of the one harmonic suppression device that stops operating.

2. The harmonic suppression system according to claim 1, wherein
   the communication unit transmits the operation information signal and receives the operation instruction signal via a power line that is an output destination of a current generated by the power converter.

3. The harmonic suppression system according to claim 2, wherein
   the power converter superimposes the operation information signal on the power line.

4. A harmonic suppression device included in the harmonic suppression system according to claim 1.

5. A harmonic suppression device constituting a harmonic suppression system with other harmonic suppression devices, comprising:
- a power converter to generate a harmonic suppression current that is an electric current for suppressing a harmonic current flowing in a power line and to output the generated harmonic suppression current to the power line;
- a communication unit to exchange signals with the other harmonic suppression devices; and
- a controller to perform control on the power converter and the other harmonic suppression devices based on a signal received by the communication unit, wherein:
- in a case where the signal is an operation information signal including information on a current, a power supply voltage, a power supply phase, and a cumulative operation time obtained by one of the other harmonic suppression devices, the controller determines a value of a harmonic suppression current to be outputted by a power converter included in the one harmonic suppression device based on the information and generates an operation instruction signal indicating the determined value;
- the communication unit transmits the operation instruction signal to the one harmonic suppression device; and
- the controller performs the control so that a cumulative operation time of a harmonic suppression device that starts to operate is shorter than a cumulative operation time of another harmonic suppression device that stops operating.

6. The harmonic suppression device according to claim 5, wherein
- the controller determines a value of the harmonic suppression current outputted by the power converter to the power line based on the information and controls the power converter to generate a harmonic suppression current having the determined value.

7. The harmonic suppression device according to claim 5, wherein the controller includes:
- an information processor to generate a signal to be transmitted to the other harmonic suppression device based on the information included in the operation information signal, and
- an instruction unit that generates an operation instruction to the power converter.

8. The harmonic suppression device according to claim 5, wherein
- in a case where the signal is an operation instruction signal indicating a value of the harmonic suppression current, the controller controls the power converter to generate a harmonic suppression current having the value indicated by the operation instruction signal.

9. The harmonic suppression device according to claim 8, wherein:
- the controller further generates an operation information signal including information on a current flowing between a load and a power line, a power supply voltage, and a power supply phase, and
- the communication unit transmits the operation information signal to a harmonic suppression device that is a transmission source of the operation instruction signal.

10. The harmonic suppression device according to claim 8, wherein
- the controller includes:
  - an information processor to generate the operation information signal; and
  - an instruction unit to generate an operation instruction to the power converter based on the operation instruction signal.

11. The harmonic suppression device according to claim 5, wherein
- the communication unit exchanges the signal via a power line that is an output destination of a current generated by the power converter.

12. The harmonic suppression device according to claim 11, wherein
- the power converter superimposes a signal to be transmitted to the other harmonic suppression device on the power line.

* * * * *